US009873369B2

(12) United States Patent
Jakobsmeyer

(10) Patent No.: US 9,873,369 B2
(45) Date of Patent: Jan. 23, 2018

(54) ILLUMINATION DEVICE FOR A VEHICLE, AND METHOD OF ATTACHMENT FOR THE ILLUMINATION DEVICE

(71) Applicant: Hella KGaA Hueck & Co., Lippstadt (DE)

(72) Inventor: Helmut Jakobsmeyer, Paderborn (DE)

(73) Assignee: Hella KGaA Hueck & Co., Lippstadt (DE)

( * ) Notice: Subject to any disclaimer, the term of this patent is extended or adjusted under 35 U.S.C. 154(b) by 139 days.

(21) Appl. No.: 14/967,995

(22) Filed: Dec. 14, 2015

(65) Prior Publication Data

US 2016/0101721 A1  Apr. 14, 2016

Related U.S. Application Data

(63) Continuation of application No. 13/359,328, filed on Jan. 26, 2012.

(30) Foreign Application Priority Data

Jan. 27, 2011  (DE) ......................... 10 2011 000 360

(51) Int. Cl.
 *B60Q 1/02* (2006.01)
 *B60Q 1/04* (2006.01)
 *B60Q 1/22* (2006.01)
(52) U.S. Cl.
 CPC ......... *B60Q 1/0475* (2013.01); *B60Q 1/0433* (2013.01); *B60Q 1/22* (2013.01)

(58) Field of Classification Search
 CPC .. B60Q 1/0433; B60Q 1/0475; B60Q 1/0683; B60Q 1/0483; B60Q 1/045; F16B 35/04
 See application file for complete search history.

(56) References Cited

U.S. PATENT DOCUMENTS

| 5,122,934 | A | * | 6/1992 | Schmidt | ................. | B60Q 1/045 |
| | | | | | | 362/496 |
| 6,550,949 | B1 | | 4/2003 | Bauer et al. | | |
| 7,168,835 | B2 | * | 1/2007 | Steinbeck | .............. | B60Q 1/045 |
| | | | | | | 362/273 |
| 2001/0005116 | A1 | | 6/2001 | Takahashi et al. | | |
| 2003/0147247 | A1 | | 8/2003 | Koike | | |
| 2005/0200463 | A1 | | 9/2005 | Situ et al. | | |

(Continued)

FOREIGN PATENT DOCUMENTS

DE 102005030676 * 1/2007 ........... B60Q 1/0433

*Primary Examiner* — Peggy Neils
(74) *Attorney, Agent, or Firm* — Husch Blackwell LLP

(57) ABSTRACT

An illumination device for vehicles, having a housing and having a plurality of holder devices for attaching the housing to a housing support and for aligning the housing with respect to a longitudinal dimension of the vehicle, a transverse dimension of the vehicle, and also a vertical dimension of the vehicle, wherein each holder device has an fastening clip connected to the housing, a hollow bolt which is functionally connected to the fastening clip when the holder device is installed, and a fastening screw for fixing the hollow bolt on the housing support, wherein at least one holder device is designed as a stabilizing device and comprises guiding means in such a manner that the housing is fixed by means of the stabilizing device in a maximum of two out of three spatial dimensions of the stabilizing device.

5 Claims, 1 Drawing Sheet

(56) References Cited

U.S. PATENT DOCUMENTS

| | | | |
|---|---|---|---|
| 2007/0207012 A1* | 9/2007 | Lorenzo | F16B 5/0233 411/546 |
| 2008/0084165 A1 | 4/2008 | Otsuka et al. | |
| 2008/0259625 A1 | 10/2008 | Noyori et al. | |
| 2010/0278612 A1* | 11/2010 | Steffenfauseweh | B60Q 1/0433 411/395 |

* cited by examiner

ILLUMINATION DEVICE FOR A VEHICLE, AND METHOD OF ATTACHMENT FOR THE ILLUMINATION DEVICE

CROSS-REFERENCE TO RELATED APPLICATIONS

This application is a continuation of application and claims priority to U.S. patent application Ser. No. 13/359,328, filed on Jan. 26, 2012 entitled "POWER-DRIVEN VEHICLE HAVING AT LEAST ONE CAMERA AND A LEAST ONE LAMP", which claims priority to and the benefit of German Patent Application No. 102011000360.6, filed Jan. 27, 2011, the content of which is hereby incorporated by reference in its entirety.

FIELD OF THE INVENTION

The invention relates to an illumination device for vehicles, having a housing and having a plurality of holder devices for attaching the housing to a housing support and for aligning the housing with respect to a longitudinal dimension of the vehicle, a transverse dimension of the vehicle, and also a vertical dimension of the vehicle, wherein each holder device has an fastening clip connected to the housing, a hollow bolt which is functionally connected to the fastening clip when the holder device is installed, and a fastening screw for fixing the hollow bolt on the housing support.

The invention also relates to a method for the attachment of a housing of an illumination device on a housing support, wherein the housing is first connected to the housing support via three holder devices, wherein the housing is then aligned with respect to a longitudinal dimension of the vehicle, a transverse dimension of the vehicle, and also a vertical dimension of the vehicle, and wherein the housing is fixed on the housing support by means of the three holder devices following the alignment of the housing.

BACKGROUND

Illumination devices for vehicles are typically attached to a housing support of the vehicle via three holder devices. A configuration having three holder device ensures that the illumination device can be attached to the vehicle support with no stress forces, particularly by means of screwing the illumination device in place. For example, holder devices are known from DE 295 09 925 U1 and from DE 10 2009 007 356 A1. These serve to align the illumination device in a longitudinal dimension of the vehicle, a transverse dimension of the vehicle, and also a vertical dimension of the vehicle. For this purpose, the holder device has a fastening clip which is connected to the housing of the illumination device, particularly molded onto the housing, a hollow bolt which is functionally connected to the fastening clip when the holder device is installed, and a fastening screw for fixing the hollow bolt on the housing support. The hollow bolt itself typically has an outer threading, and is typically screwed into a recess of the fastening clip.

The illumination device is aligned in three spatial dimensions of the holder device in two steps. The housing can be displaced axially and/or screwed into place by means of rotating the hollow bolt in a direction of installation of the hollow bolt. The fastening screw, having an outer diameter which is smaller than an inner diameter of an axial bore hole of the hollow bolt, can likewise be displaced in an alignment plane which is perpendicular to the direction of installation of the hollow bolt. In this case, the installation of the hollow bolt and the directional vectors of the alignment planes form three preferred spatial dimensions of the holder device.

For the purpose of further simplifying the attachment and the alignment of the illumination device in the housing, the holder devices are typically designed in such a manner and are attached to the housing such that the spatial dimensions of the holder devices correspond to the primary coordinates of the vehicle (the longitudinal dimension of the vehicle, the transverse dimension of the vehicle, and the vertical dimension of the vehicle). Although the attachment of the illumination device to the housing support by means of three holder devices has proven effective in principle, it can be necessary, particularly in the case of large and or especially heavy illumination devices, to have a configuration with more than three mounting points for the purpose of preventing vibrations.

SUMMARY OF THE INVENTION

The problem addressed by the present invention is therefore that of further improving an illumination device in such a manner that the same can be attached on the housing support by means of more than three holder devices, with no stress forces, and can be aligned. In addition, the invention addresses the problem of providing a method for the attachment of the illumination device.

For the purpose of addressing the problem, the invention is characterized at least in part in that at least one holder device is designed as a stabilizing device and comprises guiding means in such a manner that the housing is fixed by means of the stabilizing device in a maximum of two out of three spatial dimensions of the stabilizing device.

The particular advantage of the invention is that the additional holder device designed as a stabilizing device enables the illumination device to be attached to the housing support without stress forces due to the at least one spatial degree of freedom. The invention avoids a hyperstatic attachment of the illumination device on the housing support, such that stresses in the housing and damage thereto and/or to other components of the illumination device resulting from said stresses are prevented. The additional holder device also stabilizes the illumination device at the same time, and inhibits and/or reduces any swinging of the same.

According to a preferred embodiment of the invention, the guiding means of the stabilizing device are arranged and designed in such a manner that the housing is held on the housing support in a manner which enables the same to move in an axial dimension of the hollow bolt relative to the hollow bolt of the stabilizing device. This configuration creates an advantageous, defined degree of freedom, such that it is possible to develop the illumination device in a specific manner using computer aided design, without comprehensive experimental testing, and it is possible to create a housing which is easy to install.

According to one embodiment of the invention, all holder devices have an identical hollow bolt which is guided in a cylindrical recess of the fastening clip and which has an outer threading. The use of identical hollow bolts advantageously simplifies the installation of the illumination device on the housing support by preventing the hollow bolts from being confused, and by preventing a resulting incorrect installation. In addition, cost advantages are associated with the invention, because only one type of hollow bolt needs to be kept in inventory, and the same can be purchased in large quantities.

According to one embodiment of the invention, an inner diameter of the cylindrical recess of the fastening clip of the stabilizing device is larger than an outer diameter of an outer threading of the hollow bolt. The hollow bolt is guided via the outer threading thereof in guide ridges which serve as guiding means and which project inward toward the center of the fastening clip from the cylinder shell surface of the recess thereof. The guide ridges are, for example, designed to yield in an axial dimension of the recess of the fastening clip, or are designed with a thin segment in a connection area where the guide ridges rest on the cylinder shell surface of the fastening clip, to form a predetermined breaking point. The ability of the stabilizing device to yield in the direction of installation thereof is advantageously realized by the guide ridges being bent axially or being sheared off at the predetermined breaking point when the hollow bolt is tightened. The guide ridges also serve as guiding means for the hollow bolts during the installation. In both cases, the fastening rods [sic] are preferably connected to the fastening clip and the housing of the illumination device to form one piece, and/or are molded onto the fastening clip.

For the purpose of addressing the problem, the invention is characterized at least in part in that in one additional method step following the fixing of the housing on the housing support, a fourth holder device designed as a stabilizing device is connected to the housing support, wherein the housing is fixed by means of the stabilizing device in a maximum of two of the three spatial dimensions of the stabilizing device.

The particular advantage of the invention is that the alignment and installation process for the illumination device is particularly simple The illumination device can be initially attached to the housing support, and aligned, in the conventional manner by means of three holder devices. The fourth holding point is formed following the attachment and alignment, by means of the stabilizing device.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION

Figure 1:
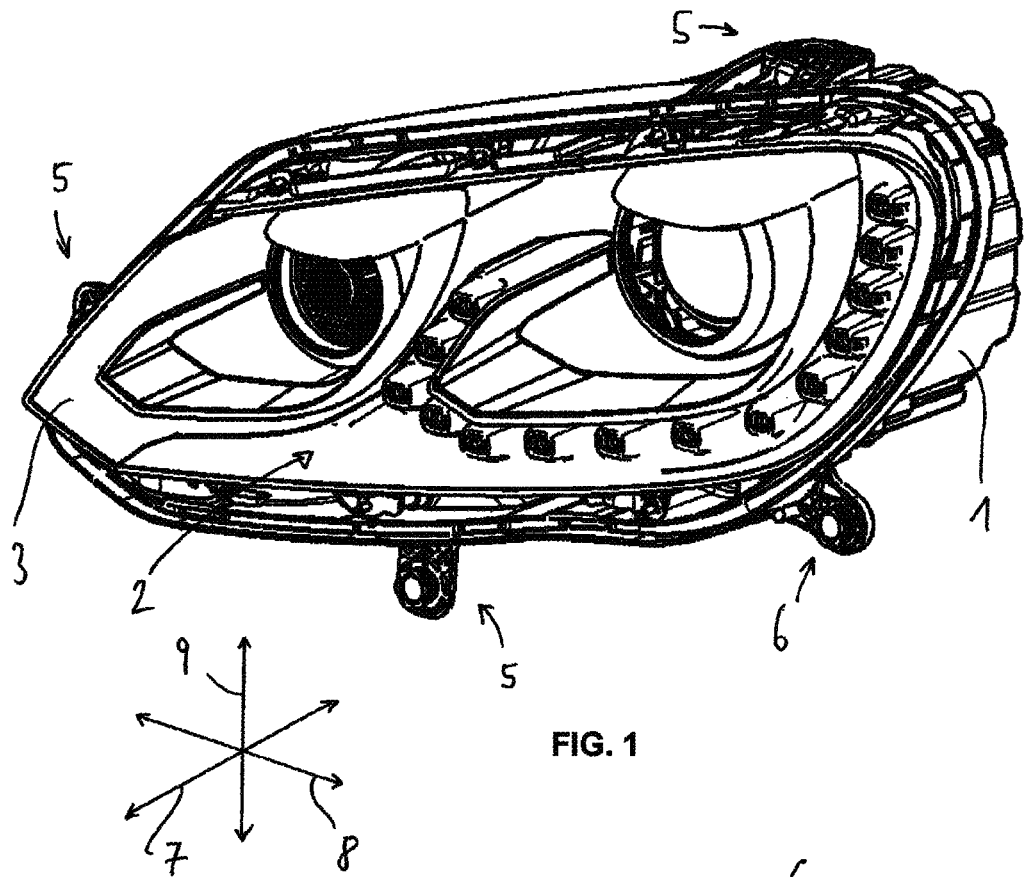
FIG. 1 shows a perspective front view of an illumination device according to the invention, having four holder devices for the purpose of connecting the illumination device to a housing support which is not shown.

An illumination device in FIG. 1 has a housing 1, a light-generating device 2 arranged in a recess of the housing 1, and a glass panel 3 which is mounted in front of the light-generating device 2 with respect to the primary beam direction thereof, and which closes the housing 1.

A total of four fixing devices 5, 6 are included for the purpose of attaching the housing 1 to a housing support 4. A total of three fixing devices 5 are arranged as fixing devices on the housing 1, distributed over the same, and these serve to fix the housing 1 on the housing support 4 and align the housing 1 in a longitudinal dimension of the vehicle 7, a transverse dimension of the vehicle 8, and also a vertical dimension of the vehicle 9. A further holder device is designed as a stabilizing device 6. The stabilizing device 6 has at least one degree of freedom in one spatial dimension of the stabilizing device 6. The illumination device is therefore not fixed in at least one spatial dimension of the stabilizing device 6.

Figures 2, 3:
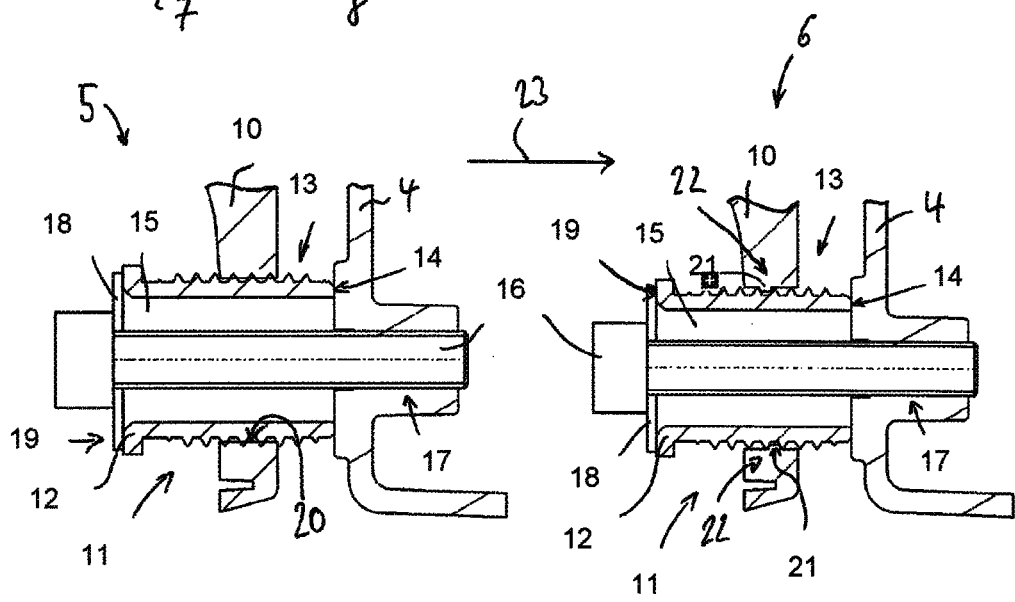
FIG. 2 shows a cutaway view through a holder device which fixes the illumination device in three spatial dimensions.
FIG. 3 shows a cutaway view of a holder device for fixing the illumination device in a maximum of two spatial dimensions, said holder unit being designed as a stabilizing device.

The holder device 5 which serves to fix the illumination device in three dimensions is shown in FIG. 2 in an installed position. The holder device 5 has a fastening clip 10 formed on the housing 1, said fastening clip having a cylindrical recess 11, a hollow bolt 12 screwed into the cylindrical recess 11, said hollow bolt 12 having an outer threading 13, having an end face 14 which rests on the housing support 4 when the hollow bolt 12 is installed, and having a cylindrical bore hole 15 as well as a fastening screw 16 which is guided through the cylindrical bore hole 15 and which fixes the hollow bolt 12 to the housing support 4. For this purpose, the fastening screw 16 engages with a fastening threading 17 of the housing support 4, and is supported by a support element 18, the latter being designed by way of example as a washer, on the end face 19 of the hollow bolt 12 which faces away from the housing support 4. Because an outer diameter of the fastening screw 16 is smaller than a diameter of the bore hole 15 of the hollow bolt 12, the illumination device can be aligned in the alignment plane which is oriented transverse to the direction of installation 23.

The outer threading 13 of the hollow bolt 12 in this case is designed as a self-cutting outer threading 13 which taps itself into a cylinder shell surface 20 of the recess 11 of the fastening clip 10 during the installation of the hollow bolt 12. To install the fixing device 5, the hollow bolt 12 is initially screwed into the recess 11 of the fastening clip 10 in a direction of installation 23. Next, the housing 1 is connected to the housing support 4 by means of the fastening screw 16. At this point, the housing 1 is not fixed to the housing support 4, such that the illumination device can be aligned. For this purpose, the hollow bolt 12 is displaced radially with respect to the fastening screw 16. The hollow bolt 12 can also be rotated, such that the fastening clip 10, and along with the same, the entire illumination device, are consequently displaced axially with respect to the hollow bolt 12.

The stabilizing device 6 in FIG. 3 likewise comprises the fastening clips 10 having the recess 11, the hollow bolt 12, and the fastening screw 16. In this case, an inner diameter of the recess 11 is larger than an outer diameter of the hollow bolt 12 in the region of the outer threading 13, such that the outer threading 13 of the hollow bolt 12 consequently does not tap itself into the cylinder shell surface 20 of the recess 11 during the installation of the hollow bolt 12. Instead, guiding means 21 which are designed as guide ridges serve to guide the hollow bolt 12 into the recess 11 during the installation, wherein said guide ridges project inward from the cylinder shell surface 20 toward the center of the recess 11.

For the purpose of installation of the stabilizing device 6, the hollow bolt 12 is initially screwed into the recess 11 of the fastening clip 10 in the direction of installation 23. The hollow bolt 12 in this case is supported via the outer threading 13 thereof in the guide ridges 21 of the stabilizing device 6. If the hollow bolt 12 is further rotated about its axis of rotation ("bottomed out") after the end face 14 of the hollow bolt 12 bottoms out against the housing support 4, an axial force is transmitted to the guide ridges 21 via the outer threading 13 of the hollow bolt 12, in a direction opposite the direction of installation 23. The guide ridges 21, which are designed with a thin segment in a connection area 22 between the guide ridges 21 and the fastening clip 10, are sheared off as a result of axial force and/or a bend in the axial dimension, such that a degree of freedom in the axial dimension (direction of installation 23) of the hollow bolt 12 is consequently formed between the hollow bolt 12 and the housing 1. The stabilizing device 6 can be fixed in a known manner by means of the fastening screw 16 in an alignment plane which runs transverse to the direction of the installation 23 of the hollow bolt 12.

For the purpose of attaching the illumination device to the housing support 4, the illumination device is initially connected to the housing support 4 by means of the three fixing devices 5 which fix the illumination device in three spatial dimensions. Then the illumination device is aligned. The illumination device is finally fixed following the alignment thereof by means of tightening the fastening screws 16 of the three fixing devices 5. In a further installation step, the stabilizing device 6 is connected to the housing support 4. Because of the guiding means 21 of the stabilizing device 6, one degree of freedom is incorporated into the direction of installation 23 of the stabilizing device 6. The housing 1 can subsequently be fixed in its final position in the alignment plane which runs transverse to the direction of installation 23, by means of inserting the fastening screw 16. When the fastening screw 16 of the stabilizing device 6 is inserted, no stresses are introduced into the illumination device and/or the housing 1 thereof because the illumination device does not need to be aligned again afterward, and the forces exerted by the fastening screw 16 are only received by the hollow bolt 12 and not by the fastening clip 10.

In the event that a re-alignment of the illumination device is necessary, for example during or after repairs, the holder device 5, 6 can first be loosened, then the headlight can be aligned, and then the 3-dimensional fixing device 5 can be fixed immediately thereafter to the housing support 4. Finally, the stabilizing device 6 can be installed as described above.

Identical components and/or component functions are indicated by the same reference numbers.

LIST OF REFERENCE NUMBERS

1 housing
2 light-generating device
3 glass panel
4 housing support
5 fixing device
6 stabilizing device
7 longitudinal dimension of the vehicle
8 transverse dimension of the vehicle
9 vertical dimension of the vehicle
10 fastening clip
11 recess
12 hollow bolt
13 outer threading
14 end face
15 bore hole
16 fastening screw
17 threading
18 support element
19 end face
20 cylinder shell surface
21 guiding means
22 connection region
23 direction of installation

The invention claimed is:

1. An illumination device for a vehicle, comprising:
a housing;
a plurality of fixing devices for attaching the housing to a housing support and for aligning the housing with respect to a longitudinal dimension of the vehicle, a transverse dimension of the vehicle, and a vertical dimension of the vehicle, each of the fixing devices including:
at least a first fastening clip connected to the housing,
at least a first hollow bolt, each said hollow bolt being functionally connected to a respective one of the at least one fastening clips when the fixing device is installed, and
at least a first fastening screw, each said fastening screw for fixing a respective on of the at least one hollow bolts on the housing support, and
a stabilizing device for attaching the housing to a housing support in a maximum of two out of three spatial dimensions of the stabilizing device, the stabilizing device including:
a second fastening clip connected to the housing,
a second hollow bolt guided in a cylindrical ecess of the second fastening clip,
the second hollow bolt including an outer threading which is functionally guided within the second fastening clip when the stabilizing device is installed, and
a second fastening screw for fixing the second hollow bolt on the housing support,
wherein a diameter of a cylindrical recess of the second fastening clip is designed to be larger than an outer diameter of the outer threading of the second hollow bolt, and
wherein at least one guide ridge projects inward toward the radial center of the cylindrical recess from a cylinder shell surface of the recess which serves as a guiding means for the second hollow bolt in such a manner that the second hollow bolt is guided on the guide ridge via the outer threading.

2. The illumination device according to claim 1, wherein the guiding means of the stabilizing device are arranged such that the housing is held on the housing support in a manner which enables the same to move in an axial dimension of the second hollow bolt relative to the second hollow bolt of the stabilizing device.

3. The illumination device according to claim 1, wherein at least one of: the guide ridge is designed to yield in an axial dimension of the recess, and that the guide ridge is designed with a thin segment in a connection region where the guide ridge is connected to the second fastening clip, for the purpose of forming a predetermined breaking point.

4. The illumination device according to claim 1 wherein the guide ridge is connected to the second fastening clip to form one piece.

5. A method for the attachment of a housing of an illumination device on a housing support, comprising the steps of:
connecting the housing to the housing support via three holder devices;
aligning the housing with respect to a longitudinal dimension of the vehicle, a transverse dimension of the vehicle, and also a vertical dimension of the vehicle;
fixing the housing on the housing support by means of the three holder devices following the alignment of the housing;
connecting a fourth holder device designed as a stabilizing device to the housing support, wherein the housing is fixed by means of the stabilizing device in a maximum of two of the three spatial dimensions of the stabilizing device;

inserting a hollow bolt of the holder device in a direction of installation into a recess of a fastening clip of the holder device;

connecting said fastening clip to the housing for the purpose of connecting the illumination device to the housing support by means of any of the holder devices until the hollow bolt rests on the housing support with an end face thereof which is functionally assigned to the housing support;

screwing a fastening screw of the holder device in through a bore hole of the hollow bolt into a fastening threading of the housing support, wherein the hollow bolt of the stabilizing device is supported during the installation of the same on at least one guide ridge which serves as a guiding means for the hollow bolt and which projects inward toward the radial center of the cylindrical recess from a cylinder shell surface of the recess of the fastening clip, and in that the at least one guide ridge is at least one of bent and sheared off in an axial dimension of the hollow bolt when the hollow bolt is subjected to a further rotary movement resting on the housing support via the hollow bolt end face.

* * * * *